Dec. 26, 1950     L. A. EPPLIN     2,535,908
RADIAL ARM POWER SAW
Filed Sept. 17, 1946     3 Sheets-Sheet 1
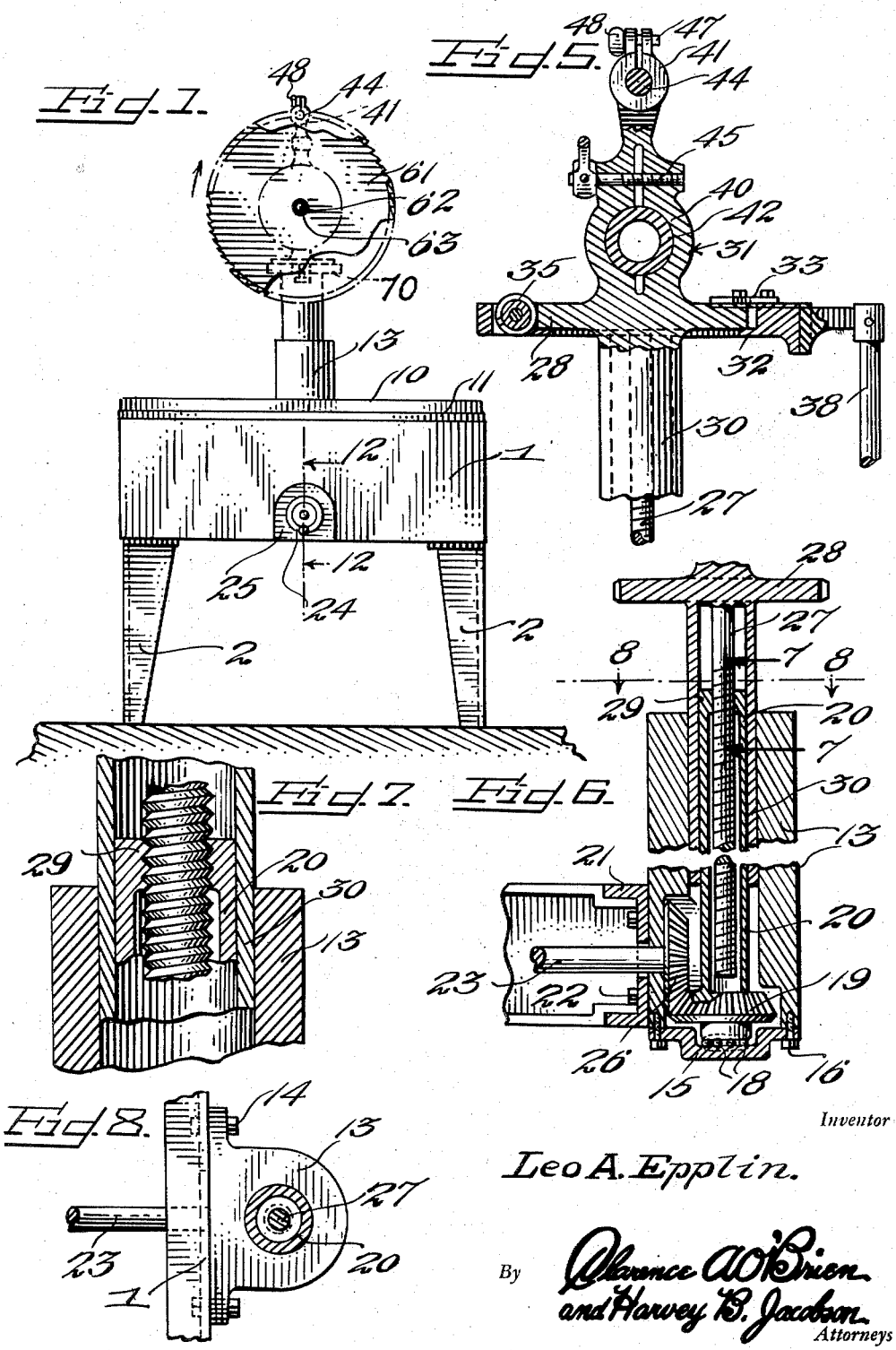
Inventor
Leo A. Epplin.
By *Clarence A. O'Brien and Harvey B. Jackson*
Attorneys

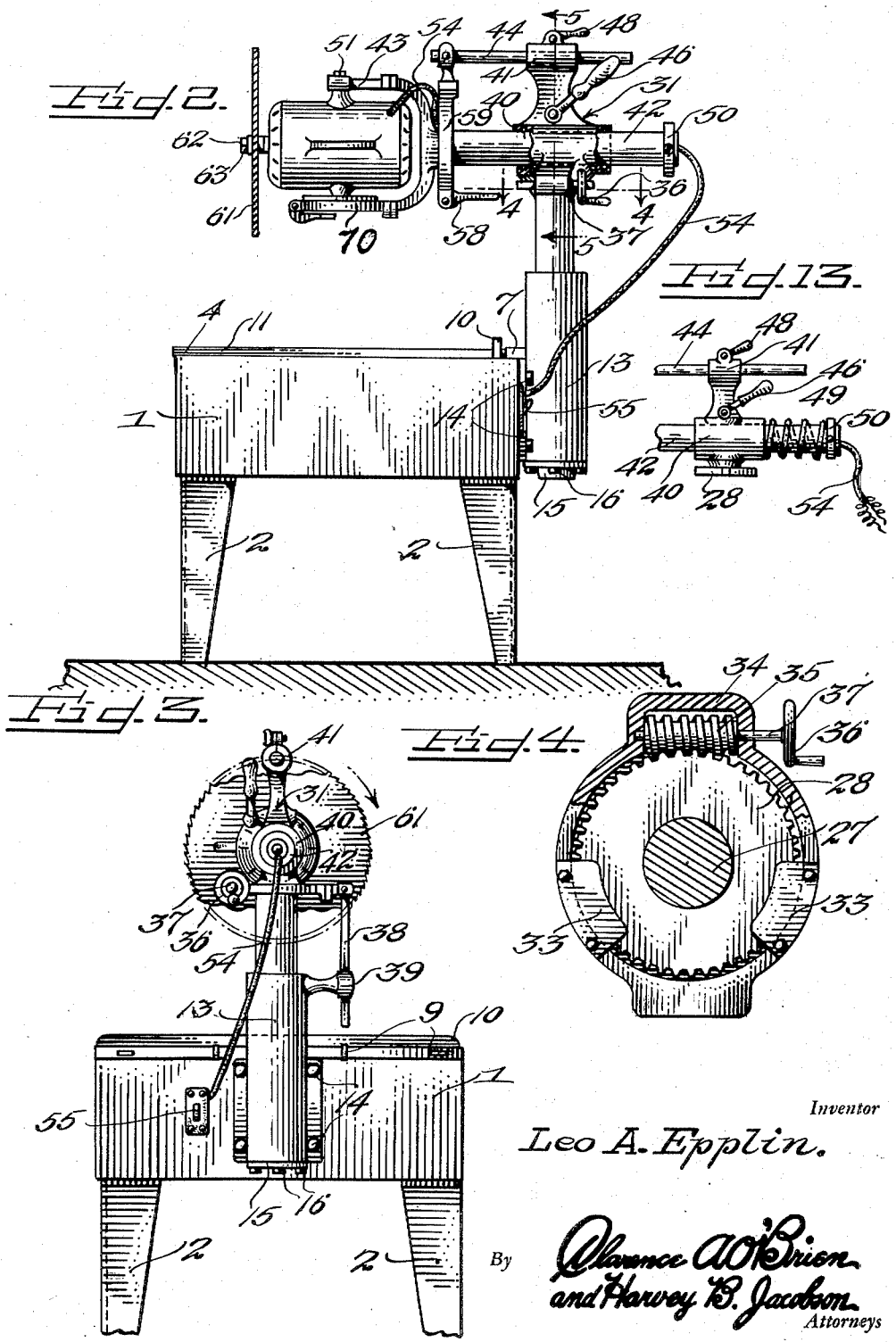

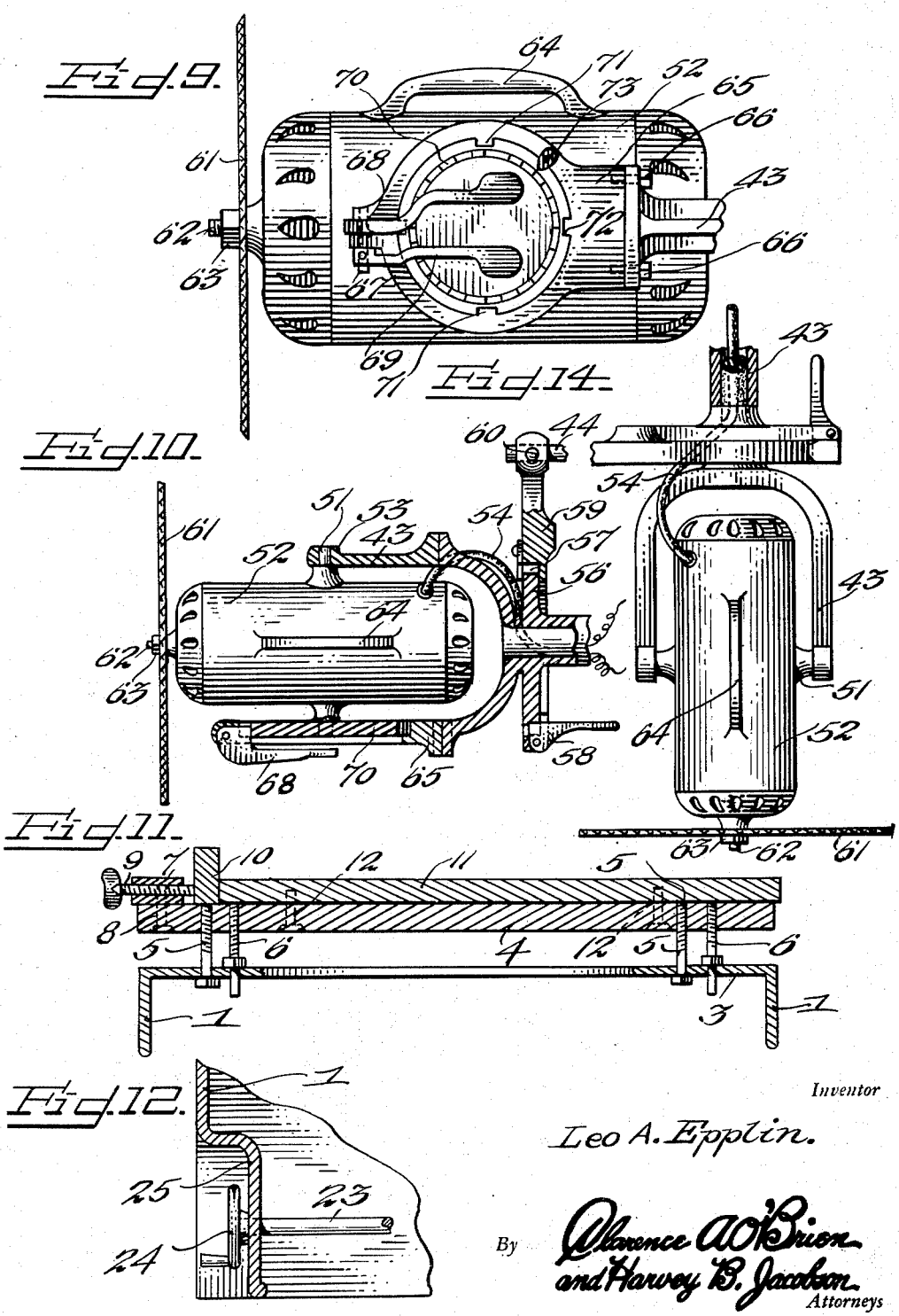

Patented Dec. 26, 1950

2,535,908

UNITED STATES PATENT OFFICE 2,535,908

RADIAL ARM POWER SAW

Leo A. Epplin, Waterloo, Ill.

Application September 17, 1946, Serial No. 697,404

3 Claims. (Cl. 143—6)

This invention relates to improvements in power saws.

An object of the invention is to provide an improved power operated saw which may be adjusted to cut at any desired angle.

Another object of the invention is to provide an improved power operated saw which will be suitably supported upon a table by means which will permit the raising and lowering of the saw, and additional means supported thereon whereby the saw and its operating motor may be universally adjusted to cut at any desired angle.

A further object of the invention is to provide an improved motor driven rotary saw which will be supported for universal adjustment upon an improved form of supporting table, said table having leveling means operable thereon to provide a level work supporting surface with respect to the saw blade.

Another object of the invention is to provide an improved universally mounted power driven rotary saw which may be used either for cross cut or rip sawing, or used to shape, route, tenon or groove, and for many other purposes.

Another object of the invention is to provide an improved rotary power operated saw which will be highly efficient in operation, and relatively inexpensive to manufacture and produce.

Other objects will appear as the description proceeds.

In the accompanying drawings which form a part of this application,

Figure 1 is a front elevation of the improved power operated saw and supporting table therefor;

Figure 2 is a side elevation of the improved power operated saw and supporting table therefor;

Figure 3 is a rear view of the improved power operated saw and supporting table therefor;

Figure 4 is a sectional view taken on the line 4—4 of Figure 2;

Figure 5 is a sectional view taken on the line 5—5 of Figure 2;

Figure 6 is a vertical sectional view taken through the fixed head member showing the jack mechanism therein used for raising and lowering the power driven rotary saw;

Figure 7 is a sectional view taken on the line 7—7 of Figure 6;

Figure 8 is a sectional view taken on the line 8—8 of Figure 6;

Figure 9 is a side elevation of the electric motor with rotary saw blade mounted thereon;

Figure 10 is a plan view of the electric motor and saw shown mounted in its yoke support;

Figure 11 is a sectional view taken through the upper portion of the table showing the leveling mechanism therefor;

Figure 12 is a detail sectional view taken on the line 12—12 of Figure 1;

Figure 13 is a detail side elevation of the motor supporting head and column with cushioning springs mounted thereabout, and Figure 14 is a front elevation of the motor and saw shown supported in a vertical position.

Like characters of reference are used throughout the following specification and the accompanying drawings to designate corresponding parts.

In carrying out the invention, there is provided a supporting table generally denoted by the reference numeral 1 which may be either formed of wood or of metal as desired. In the drawings the table 1 has been illustrated as being formed in the shape of a metal drum, and is supported in spaced relation from the floor or ground by means of the metal angle iron legs 2 attached to said drum or body in any desired manner.

The upper end of the metal table 1 is formed with an inwardly extending annular flange 3 and supports the table base member 4 in spaced relation thereto for leveling the same by means of the bolts 5 and 6, as clearly illustrated in Figure 11 of the drawings.

A rear rail 7 is secured to the base member 4 by means of the screws 8, and supports a plurality of transversely disposed adjustable wing screws 9 extending therethrough to engage the fence strip 10 secured to the upper table surface member 11 which is adjustably disposed upon the base member 4, and held in the desired adjustment by means of the screws 12 extending through said members 4 and 11.

A vertically extending tubular head member 13 is fixed to the rear of the table body 1 by means of the bolts 14 and is closed at its bottom end by the cap member 15 secured by the bolts 16, and in which is formed the cylindrical depressed ball bearing race 17 for the ball bearings 18 disposed below the bevel gear 19 formed on the lower end of the sleeve 20. A reinforcing housing 21 is secured to the inner and lower portion of the table 1 by means of the bolts 22, and supports the shaft 23 in which the operating hand wheel 24 is secured and received in the depression 25 in the front of the table 1. The bevel gear 26 is secured to the rear end of the shaft 23 and intermeshes with the bevel gear 19.

The vertically extending jack screw 27 is formed integrally with the transversely extending spur gear 28 and depends therefrom to pass through the nut 29 formed in the upper end of sleeve 20. A depending sleeve 30 is also formed on said gear 28 concentrically about screw 27 and slidably engages the outer surface of the sleeve 20.

The spur gear 28 is formed upon the lower end of the upper guide head 31, and supports an annular casing member thereabout by means of the inwardly extending flange 32 on its lower end, and by means of the ears 33 bolted to the upper surface of said annular casing member. An offset rib 34 (Fig. 4) is formed on the annular casing member and serves as a bearing for the worm gear 35 which meshes with the spur gear 28 and is provided with an operating hand wheel 36 on the end of its shaft 37, whereby rotation of the hand wheel 36 will swing the guide head 31 laterally from side to side and in a horizontal plane. The vertical rod 38 will be disposed between the annular casing member and a vertically apertured guide bracket 39 on the head member 13 to retain the associated parts in fixed position as they are adjusted vertically with respect to each other. See Fig. 3.

The upper guide head 31 comprises the integrally formed spaced horizontally extending parallel split bearings 40 and 41, which are adapted to receive the tubular sleeve 42 upon which the yoke 43 is supported, and the guide rod 44, respectively. A clamping lock screw 45 will extend through the upper guide head 31 and transversely of a slot in the bearing 40, and is provided with a hand lever 46, whereby movement of the hand lever in one direction releases the sleeve 42 for movement to said bearing, and the turning of a hand lever 46 in the opposite direction will cause the slotted bearing to tighten on said sleeve body so that the same is held in fixed position. A locking bolt 47 is threaded through the split ends of the upper bearing 41 in the guide head 31, and is formed with an operating finger 48 on its end, whereby movement of the operating finger in one direction releases the guide rod 44, and movement of the said operating finger in the opposite direction causes the split bearing 41 to bind upon the guide rod 44 to hold the same in the desired adjusted position.

As seen in Figure 13 of the drawings, a coil spring 49 will be disposed about the inner end of the sleeve 42 between the bearing 40 and the collar 50 supported about the inner end of said sleeve 42, the purpose of which is to absorb the shock when said sleeve 42 is pulled forwardly in the guide head 31.

The oppositely disposed trunnions 51 are formed on the electric motor 52, and are supported in the bearings 53 at the outer ends of the yoke 43 for the purpose of supporting said motor. An electric conductor 54 will be connected with the electric motor 52 and will extend through the tubular sleeve 42 and extend to the electric switch 55 (Fig. 3) positioned upon the table 1, and then to a source of electric current supply (not shown).

A disk 56 (Fig. 10) will be formed integrally with the outer end of the sleeve 42 adjacent the yoke 43 and will be provided with a plurality of peripheral notches 57 into which the pivoted latching finger 58 may be disposed to hold the motor in the desired adjustment. The finger 58 will be pivotally supported upon the locking ring 59 secured by means of a screw or pin 60 to the forward end of the guide rod 44. It will therefore be seen that the pivoted latching finger 58 may be removed from the peripheral slot in which it was disposed and the motor and yoke may be rotated axially as desired, whereupon the latching finger 58 may be again received in the proper locking notch to hold the motor in fixed position.

A rotary saw blade 61 will be disposed upon the motor shaft 62, and locked thereon by means of the nut 63 which will be threaded upon the outer end of said motor shaft.

The electric motor 52 will be provided with a handle member 64 extending longitudinally thereof, whereby the same may be grasped when the motor is to be rotated about the axis of the bearing 40 for the tubular sleeve 42, which supports the yoke 43 upon which the motor 52 is mounted.

In order that the electric motor 52 may be tilted upon its trunnions 51 in the bearings 53 with respect to the yoke 43, there is provided a cylindrical casing 65 which is secured by means of a bolt 66 to the said yoke 43, and is provided with a split outer end through which the shaft 67 is mounted, and upon which the locking finger 68 is mounted for relative movement between the adjacent open ends of the said casing 65. A second locking finger 69 is secured to the outer end of shaft 67, and when depressed will cam the ends of the said casing together to clamp upon the calibrated disk 70 which is formed integrally with one of the trunnions 51. A plurality of peripheral slots 71 will be formed in the edge of the disk 70, and will be adapted to be engaged by the lug 72 on the said casing 65 for positioning the motor at 90° or 180° as desired. The indicating finger 73 is secured to the casing 65 and cooperates with the calibrations upon the disk 70 so that the motor may be set at any desired and known angle with respect to the work which is to be sawed.

From the foregoing description, it will be seen that the motor may be turned to assume a vertical position with the saw blade 61 extending below the same and in a horizontal position. When the motor and saw are in this position, the same may be used for shaping, routing, making tenons and grooves.

It will be seen from the foregoing description that there has been devised and provided a highly efficient form of power saw which will be universally supported and mounted so that the saw may be operated at any desired angle to make any angular cuts.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A power saw comprising a supporting table, a tubular vertically disposed head member attached to said table, a screw jack operable in said head member, a guide head supported by said screw jack, a tubular yoke supporting sleeve slidably supported in said guide head, a yoke member secured on said sleeve and disposed above said table, an apertured disc integral with said tubular sleeve, a guide rod axially adjustably mounted on said guide head, a locking ring fixed to said guide rod and disposed coaxially of said sleeve, a disc integral with said sleeve and rotatable within said locking ring, means for adjustably securing said disc to said locking ring, a motor tiltably supported in said yoke, and a rotary saw supported and operated by said motor in operative position above said table.

2. A power saw comprising a supporting table, a tubular vertically disposed head member attached to said table, a screw jack operable in said head member, a guide head supported by said screw jack, a tubular yoke supporting sleeve slidably supported in said guide head, a yoke member secured on said sleeve and disposed above said table, an apertured disc integral with said tubular sleeve, a guide rod axially adjustably mounted on said guide head, a locking ring fixed to said guide rod and disposed coaxially of said sleeve, a disc integral with said sleeve and rotatable within said locking ring, means for adjustably securing said disc to said locking ring, a motor tiltably supported in said yoke, and a rotary saw supported and operated by said motor, said guide head being rotatively adjustable about the vertical axis of the screw jack.

3. A power saw comprising a supporting table, a tubular vertically disposed head member attached to said table, a screw jack operable in said head member, a guide head supported by said screw jack, a tubular yoke supporting sleeve slidably supported in said guide head, a yoke member secured on said sleeve and disposed above said table, an apertured disc integral with said tubular sleeve, a guide rod axially adjustably mounted on said guide head, a locking ring fixed to said guide rod and disposed coaxially of said sleeve, a disc integral with said sleeve and rotatable within said locking ring, means for adjustably securing said disc to said locking ring, a motor tiltably supported in said yoke, and a rotary saw supported and operated by said motor, said guide head being rotatively adjustable about the vertical axis of the screw jack, said motor being rotatively adjustable about the axis of its pivotal support of the yoke, whereby the saw is adjustable in three planes relative to the table.

LEO A. EPPLIN.

REFERENCES CITED

The following references are of record in the file of this patent:

UNITED STATES PATENTS

| Number | Name | Date |
| --- | --- | --- |
| 543,574 | Ehrhardt | July 30, 1895 |
| 1,543,051 | Bloodgood | June 23, 1925 |
| 1,628,845 | Jackson | May 17, 1927 |
| 1,636,924 | Porter | July 26, 1927 |
| 1,644,887 | Mansfield | Oct. 11, 1927 |
| 1,697,873 | Lambert | Jan. 9, 1929 |
| 1,748,446 | Gatzsch | Feb. 25, 1930 |
| 1,805,043 | Horton | May 12, 1931 |
| 1,866,888 | Hawley | July 12, 1932 |
| 2,312,356 | Ocenasek | Mar. 2, 1943 |
| 2,317,568 | Wallace et al. | Apr. 27, 1943 |
| 2,329,357 | Mowery et al. | Sept. 14, 1943 |
| 2,356,610 | Penney | Aug. 22, 1944 |
| 2,382,971 | Broco et al. | Aug. 21, 1945 |
| 2,422,843 | Moordian | June 24, 1947 |

FOREIGN PATENTS

| Number | Country | Date |
| --- | --- | --- |
| 436,873 | France | Feb. 3, 1912 |
| 434,231 | Germany | Sept. 17, 1926 |
| 274,236 | Great Britain | July 21, 1927 |